US011295476B2

(12) United States Patent
Alonso

(10) Patent No.: US 11,295,476 B2
(45) Date of Patent: Apr. 5, 2022

(54) METHODS AND SYSTEMS TO INCREASE ACCURACY OF EYE TRACKING

(71) Applicant: The Nielsen Company (US), LLC, New York, NY (US)

(72) Inventor: Rafael E. Alonso, Tampa, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

(21) Appl. No.: 16/999,764

(22) Filed: Aug. 21, 2020

(65) Prior Publication Data
US 2020/0380728 A1 Dec. 3, 2020

Related U.S. Application Data

(63) Continuation of application No. 16/404,132, filed on May 6, 2019, now Pat. No. 10,755,440, which is a
(Continued)

(51) Int. Cl.
G06T 7/80 (2017.01)
G06K 9/00 (2022.01)
(Continued)

(52) U.S. Cl.
CPC .............. G06T 7/80 (2017.01); G06F 3/013 (2013.01); G06K 9/00604 (2013.01); G06T 7/74 (2017.01); G06T 2207/30201 (2013.01)

(58) Field of Classification Search
CPC ... G06T 7/80; G06T 7/74; G06T 2207/30201; G06F 3/013; G06F 3/0304; G06K 9/00604
See application file for complete search history.

(56) References Cited

U.S. PATENT DOCUMENTS 5,802,208 A 9/1998 Podilchuk et al.
6,637,883 B1 10/2003 Tengshe et al.
(Continued)

FOREIGN PATENT DOCUMENTS

WO 2016151581 9/2016

OTHER PUBLICATIONS

Raney et al., "Using Eye Movements to Evaluate the Cognitive Processes Involved in Text Comprehension," J. Vis. Exp. (83), e50780, doi:10.3791/50780 (2014), 14 pages.
(Continued)

Primary Examiner — Tat C Chio
(74) Attorney, Agent, or Firm — Hanley, Flight & Zimmerman, LLC

(57) ABSTRACT

Systems and methods to monitor and interact with users viewing screens are disclosed. An example system includes a sensor to gather gaze data from a user viewing images on a display. The display has spatial coordinates. The system includes a processor communicatively coupled to the display and the sensor. The processor determines a first gaze location having first spatial coordinates based on the gaze data and calibration settings associated with determining gaze locations. The processor alters a portion of the display at or near the first gaze location. After the portion of the display has been altered, the processor determines a second gaze location having second spatial coordinates based on the gaze data and the calibration settings. The processor performs a comparison of the first gaze location to the second gaze location. If the comparison does not meet a threshold, the processor updates the calibration settings based on the comparison and determines a third gaze location having third spatial coordinates based on the gaze data and the updated calibration settings.

29 Claims, 7 Drawing Sheets

Related U.S. Application Data continuation of application No. 15/491,682, filed on Apr. 19, 2017, now Pat. No. 10,304,209.

(51) Int. Cl.
*G06F 3/01* (2006.01)
*G06T 7/73* (2017.01)

(56) References Cited

U.S. PATENT DOCUMENTS

| | | |
|---|---|---|
| 6,940,545 B1 | 9/2005 | Ray et al. |
| 9,575,559 B2 | 2/2017 | Andrysco |
| 9,766,700 B2 | 9/2017 | Lyons et al. |
| 9,936,195 B2 | 4/2018 | Horesh |
| 10,304,209 B2 | 5/2019 | Alonso |
| 10,620,457 B2 | 4/2020 | Ain-Kedem |
| 10,755,440 B2 | 8/2020 | Alonso |
| 2014/0163329 A1 | 6/2014 | Brown, Jr. et al. |
| 2014/0226131 A1 | 8/2014 | Lopez et al. |
| 2015/0331485 A1* | 11/2015 | Wilairat ............ G02B 27/0093 345/156 |
| 2016/0109945 A1 | 4/2016 | Kempinski |
| 2016/0139665 A1* | 5/2016 | Lopez ................ G06T 7/70 345/156 |
| 2016/0342205 A1 | 11/2016 | Shigeta et al. |
| 2017/0278172 A1 | 9/2017 | Dey et al. |
| 2018/0014037 A1 | 1/2018 | Venkatraman et al. |
| 2018/0308252 A1 | 10/2018 | Alonso |
| 2019/0236390 A1 | 8/2019 | Guo et al. |
| 2019/0258857 A1 | 8/2019 | Alonso |
| 2020/0125179 A1 | 4/2020 | Okuley |

OTHER PUBLICATIONS

United States Patent and Trademark Office, "Non-Final Office Action", issued in connection with U.S. Appl. No. 15/491,682 dated Aug. 10, 2018, 8 pages.

United States Patent and Trademark Office, "Notice of Allowance and Fee(s) Due", issued in connection with U.S. Appl. No. 15/491,682 dated Jan. 7, 2019, 8 pages.

United States Patent and Trademark Office, "Non-Final Office Action", issued in connection with U.S. Appl. No. 16/404,132 dated Oct. 18, 2019, 11 pages.

United States Patent and Trademark Office, "Notice of Allowance and Fee(s) Due", issued in connection with U.S. Appl. No. 16/404,132 dated Apr. 22, 2020, 8 pages.

* cited by examiner

METHODS AND SYSTEMS TO INCREASE ACCURACY OF EYE TRACKING

RELATED APPLICATION

This patent arises from a continuation of U.S. application Ser. No. 16/404,132 (now U.S. Pat. No. 10,755,440), titled "Methods and Systems and Increase Accuracy of Eye Tracking," filed May 6, 2019, which is a continuation of U.S. application Ser. No. 15/491,682 (U.S. Pat. No. 10,304,209), titled "Methods and Systems and Increase Accuracy of Eye Tracking," filed Apr. 19, 2017, both of which are hereby incorporated by this reference in their entireties.

FIELD OF THE DISCLOSURE

This disclosure relates generally to monitoring media and, more particularly, to methods and systems to increase accuracy of eye tracking.

BACKGROUND

In recent years, electronic displays (e.g., associated with personal computers, mobile devices, etc.) have been implemented with eye tracking systems to determine where users are looking relative to the displays. Common eye tracking systems utilize cameras or optical sensors (e.g., photodetectors, etc.) to detect visible or infrared light emitting or reflecting from the users. As the users focus their attention to media content (e.g., pictures, videos, advertisements, etc.) presented via the displays, the eye tracking systems can calculate or estimate gaze locations associated with where the users are looking relative to the displays.

Often, known eye tracking systems provide inaccuracy or error when estimating gaze locations. That is, the estimated gaze locations are different from where the users are actually looking (i.e., true gaze locations). Typically, before the users view desired media content and/or generally use the displays, these known eye tracking systems may require the users to perform one or more calibration processes to aid estimations of the gaze locations. These known calibration processes typically prompt and require the users, for example, to follow steps and/or a set of instructions. Thus, these known calibration processes can be distracting, time consuming and/or, more generally, undesirable to the users viewing the displays.

BRIEF DESCRIPTION OF THE DRAWINGS

The drawing(s) are not to scale. Wherever possible, the same reference numbers will be used throughout the drawing(s) and accompanying written description to refer to the same or like parts.

DETAILED DESCRIPTION

Figure 1:
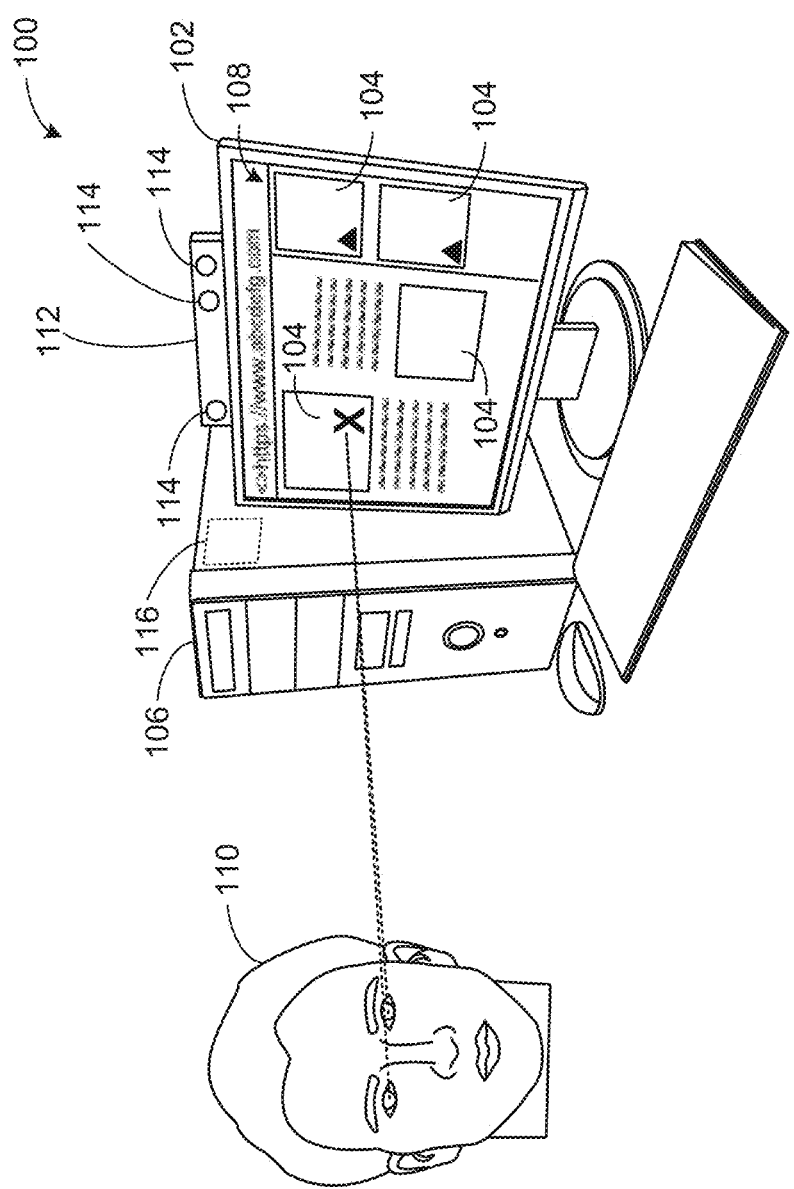
FIG. 1 illustrates an example display and an example eye tracking system in accordance with the teachings of this disclosure.

Methods and systems to increase accuracy of eye tracking are disclosed. Eye tracking methods and systems collect gaze data associated with a user's attention or gaze relative to a display while viewing media content (e.g., pictures, videos, advertisements, etc.). This gaze data may be advantageously used to optimize the media content provided to the users, in addition to other uses. For example, media content providers, or other entities such as advertising companies, are often interested in viewing behavior and/or habits of different users.

Examples disclosed herein optimize eye tracking systems by increasing accuracy when calculating and/or estimating gaze locations. Additionally or alternatively, examples disclosed herein can perform one or more calibration processes while reducing and/or eliminating distractions, disturbances, and/or inconveniences perceived by users.

For example, an example system disclosed herein includes a sensor to gather gaze data from a user viewing images on a display. The display has spatial coordinates. The example system includes an example processor communicatively coupled to the display and the sensor. The example processor determines a first gaze location having first spatial coordinates based on the gaze data and calibration settings associated with determining gaze locations. The example processor alters a portion of the display at or near the first gaze location. After the portion of the display has been altered, the example processor determines a second gaze location having second spatial coordinates based on the gaze data and the calibration settings. The example processor performs a comparison of the first gaze location to the second gaze location. If the comparison does not meet a threshold, the example processor updates the calibration settings based on the comparison and determines a third gaze location having third spatial coordinates based on the gaze data and the updated calibration settings.

Also, some disclosed examples provide or utilize a display having a screen to present images to a user, such as, for example, a light-emitting diode display, a projection display, etc. One or more example cameras and/or optical sensors are positioned near the display and configured to gather gaze data from a user viewing the images. An example processor is communicatively coupled to the sensor(s) to receive and/or process the gaze data. In some disclosed examples, the example processor determines a first gaze location of the user having first spatial coordinates relative to the display based on the gaze data and calibration settings associated with determining gaze locations.

In some examples, the processor is communicatively coupled to the display to at least partially control the presented images. For example, after determining the first gaze location, the processor alters a portion of the display at or near the first gaze location, which may cause the user to react and/or change his or her attention or gaze to the altered portion. In some disclosed examples, the processor repeatedly alters the portion of the display at periodic or aperiodic time intervals (e.g., between about 1 millisecond and about 100 milliseconds), which may be associated with reaction or response characteristics of the user. Additionally or alternatively, the portion of the display that is altered can be positioned offset from the first spatial coordinates by a pre-determined distance, which may provoke a different and/or a unique response from the user. In some examples, the processor alters the portion of the display by changing a color of one or more pixels to contrast adjacent pixels to facilitate a natural reaction to the altered portion of the display by the user. Similarly, in other examples, the processor alters the portion of the display by including a first shape that contrasts a second shape surrounding or adjacent to the first shape.

After the portion of the display has been altered, the example processor determines a second gaze location having second spatial coordinates based on the gaze data and the calibration settings. The example processor performs a comparison of the first gaze location to the second gaze location. In such examples, if the comparison does not meet a threshold (e.g., at least some of the calibration settings are not optimal or otherwise indicate that the results will not be accurate), the processor updates the calibration settings based on the comparison. The processor also determines a third gaze location having third spatial coordinates based on the gaze data and the updated calibration settings.

As used herein, when the calibration settings are referred to as "optimal", the calibration settings provide accurate gaze locations when used to at least partially determine one or more gaze locations. Conversely, as used herein, when the calibration settings are referred to as "not optimal", the calibration settings provide inaccurate gaze locations when used to at least partially determine the one or more gaze locations.

In some examples, the processor continues iterations of display alterations and gaze location comparisons until the threshold is met, which may indicate the calibration settings are optimal and/or accurate and on ongoing data collection will be accurate. After numerous iterations, some disclosed examples advantageously utilize one or more machine learning methods and/or techniques to train the eye tracking system to the user, thereby further increasing and/or maximizing accuracy of the determined gaze points as the iterations continue.

Also disclosed herein is an example method that includes presenting images to a user via a display. The display has spatial coordinates associated with the images. The example method includes gathering gaze data from the user viewing the images via a sensor. The example method includes determining a first gaze location having first spatial coordinates based on the gaze data and calibration settings associated with determining gaze locations. The example method includes altering a portion of the display at or near the first gaze location. After the portion of the display has been altered, the example method includes determining a second gaze location having second spatial coordinates based on the gaze data and the calibration settings. The example method includes performing a comparison of the first gaze location to the second gaze location. If the comparison does not meet a threshold, the method includes updating the calibration settings based on the comparison and determining a third gaze location having third spatial coordinates based on the gaze data and the updated calibration settings.

In addition, an example tangible machine-readable storage medium comprises instructions which, when executed, causes a processor to present images to a user via a display. The display has spatial coordinates associated with the images. The example instructions cause the processor to gather gaze data from the user viewing the images via a sensor. The example instructions cause the processor to determine a first gaze location having first spatial coordinates based on the gaze data and calibration settings associated with determining gaze locations. The example instructions cause the processor to alter a portion of the display at or near the first gaze location. After the portion of the display has been altered, the processor is to determine a second gaze location having second spatial coordinates based on the gaze data and the calibration settings. The example instructions cause the processor to perform a comparison of the first gaze location to the second gaze location. If the comparison does not meet a threshold, the processor is to update the calibration settings based on the comparison and determines a third gaze location having third spatial coordinates based on the gaze data and the updated calibration settings.

FIG. 1 illustrates an example system 100 in accordance with the teachings of this disclosure. The example system 100 includes an example graphic display 102 to present media content (e.g., text, pictures, videos, etc.) and/or, more generally, to present graphics and/or images 104. The display 102 can be a light-emitting diode display, a liquid crystal display, a projection display, etc., that may be associated with an electronic device 106 (e.g., a personal computer, a mobile device, a tablet, etc.). The display 102 includes a screen 108 to provide spatial coordinates (e.g., x-coordinates, y-coordinates, etc.) associated with the presented images 104 and relative to the screen 108 and/or the display 102. For example, the display 102 may present the images 104 at one or more spatial coordinate(s) on the screen 108 of the display 102 by controlling and/or altering one or more pixel(s) on the screen 108. In some examples, the screen 108 is curved and/or not flat. In this example, the screen 108 is flat.

In the illustrated example of FIG. 1, a user 110 (e.g., a person, a subject, a panelist, a viewer, and/or an audience member) views and/or interacts with the display 102 such as for personal entertainment, education, business, shopping, etc., and/or any other suitable or typical use of the display 102. In some examples, more than one user 110 can be using and/or viewing the display 102 at the same time.

The example system 100 includes an example eye tracking system 112 operatively and/or communicatively coupled to the display 102 to monitor and/or interact with the user 110. In the illustrated example of FIG. 1, the eye tracking system 112 deterninizes gaze locations associated with the user 110 viewing the display 102. As used herein, the term "gaze point" and/or "gaze location" is/are expressly defined to include a point and/or location (e.g., provided by the above-mentioned spatial coordinates) positioned on the screen 108 and/or the display 102 and associated with where the user 110 is looking when viewing the display 102. For example, as the user 110 focuses his or her attention or gaze to different spatial coordinates positioned on the screen 108 of the display 102, the eye tracking system 112 automatically determines these spatial coordinates and generates corresponding data (e.g., values of x-coordinates, y-coordinates, time, etc.).

In the illustrated example of FIG. 1, the eye tracking system 112 includes one or more cameras and/or sensors 114 to generate and/or gather gaze data associated with the user 110 viewing the display 102. For example, the sensor(s) can be one or more phototransistors, photoresistors, etc., and/or, more generally, optical sensors operable to detect infrared and/or visible light emitting or reflecting from the user 110 (e.g., via an eye of the user 110) and generate associated data in response. In some examples, the sensor(s) 114 can be positioned on the user 110 (e.g., via headset). In this example, the sensor(s) are positioned adjacent and/or near the user 110 and coupled to the eye tracking system 112 and/or the display 102. In other examples, the sensor(s) 114 may be resident within the display 102 and/or may be positioned discreetly, such that the user 110 does not notice the sensor(s) 114 when viewing the display 102.

As the user 110 views the images 104 presented via the display 102, the sensor(s) 114 generate and/or gather data associated with where the user 110 is looking relative to the screen 108 and/or the display 102. For example, the user 110 may be looking at one or more image(s) 104 (e.g., an advertisement) positioned at one or more spatial coordinate(s) on the screen 108. Based on this gathered data, the eye tracking system 112 can implement (e.g., by using a processor) one or more algorithms or equations to determine associated gaze locations.

In some examples, the eye tracking system 112 and/or a processor 116 associated with the eye tracking system 112 executes one or more calibration processes to update and/or at least partially determine the gaze locations, which is disclosed in greater detail below. For example, the eye tracking system 112 may be trained to a different user 110 having different reflection characteristics (e.g., associated with their eye) relative to the current user 110. In some such examples, the eye tracking system 112 may determine gaze locations that are different relative to where the user 110 is actually looking (i.e., true gaze locations), which may be corrected and/or compensated by advantageously using calibration settings, such as one or more calibration vectors (e.g., 2D vectors). This difference between a determined gaze location and a true gaze location of the user 110 can vary among different users 110 and/or the images 104 presented via the display 102.

As disclosed above, the eye tracking system 112 can include and/or implement a processor 116 (e.g., resident in the eye tracking system 112 and/or an electronic device associated with the eye tracking system 112) to at least partially determine these gaze locations. In this example, the processor 116 is resident within the electronic device 106 associated with the eye tracking system 112 and/or the display 102. In other examples, the processor 116 is resident within the eye tracking system 112 and/or controls the eye tracking system 112 via one or more wireless, wired, and/or web-based communication networks (e.g., via the Internet, etc.). For example, the processor 116 may be resident within a cloud-computing platform and/or a server capable of communicating with and/or controlling the eye tracking system 112 from a remote location.

In some examples, the eye tracking system 112 generates and/or controls the images 104 presented via the display 102 to provoke a reaction or response from the user 110. For example, the eye tracking system 112 alters portions and/or pixels of the display 102 while the user 110 is viewing the images 104 to cause the user 110 to change his or her attention or gaze to the altered portion, which is disclosed in greater detail below in connection with FIGS. 3A, 3B and 3C.

Figure 2:
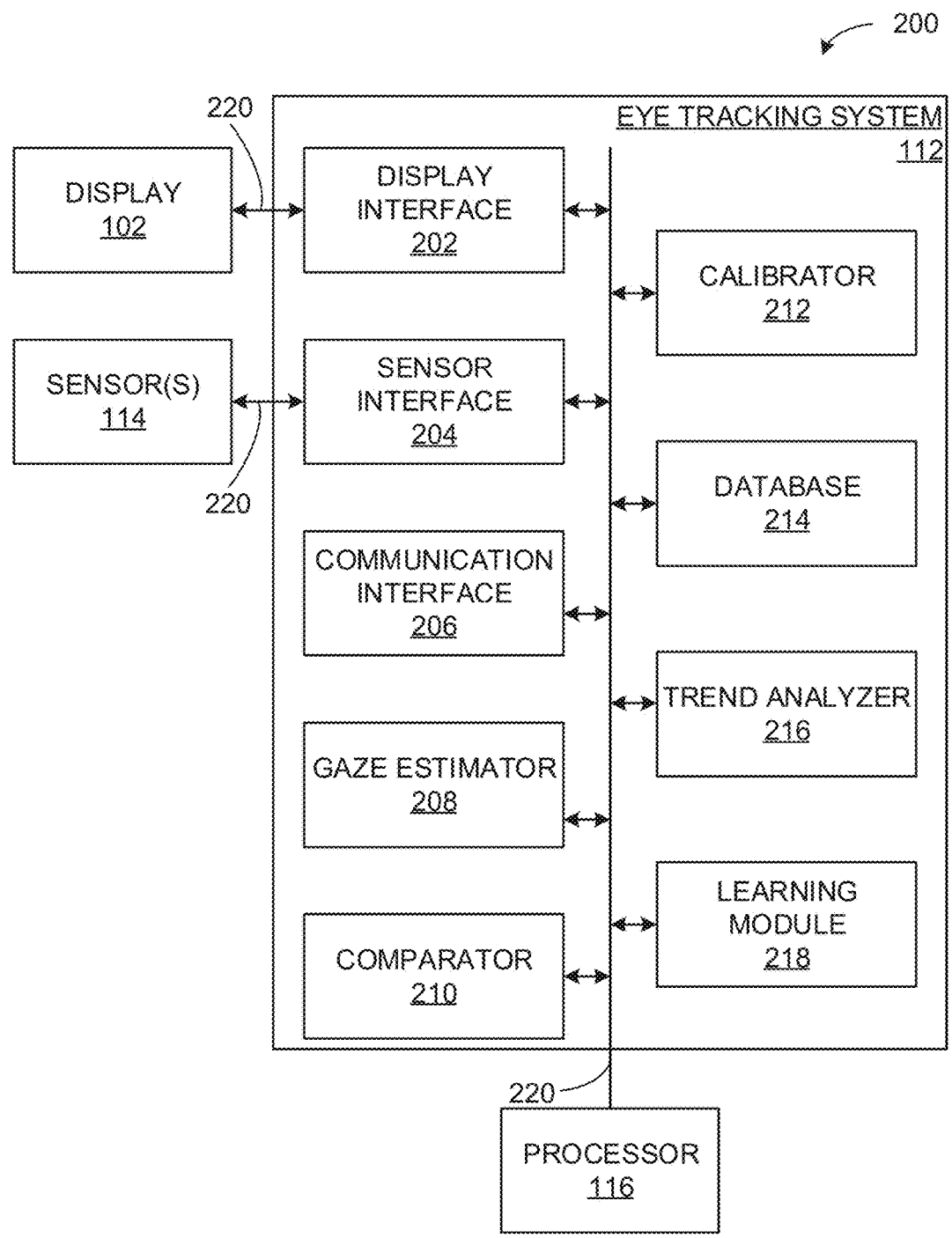
FIG. 2 is a block diagram of the example eye tracking system of FIG. 1 in accordance with the teachings of this disclosure.

FIG. 2 is a block diagram 200 of the example eye tracking system 112 of FIG. 1 to implement the examples disclosed herein. In the illustrated example of FIG. 2, the example eye tracking system 112 (e.g., a system and/or an apparatus) includes the example display 102, the example sensor(s) 114, and/or the example processor 116 of FIG. 1. Additionally or alternatively, the example eye tracking system 112 includes an example display interface 202, an example sensor interface 204, an example communication interface 206, an example gaze estimator 208, an example comparator 210, an example calibrator 212, an example database 214, an example trend analyzer 216, and an example learning module 218.

While an example manner of implementing the example eye tracking system 112 of FIG. 1 is illustrated in FIG. 2, one or more of the elements, processes and/or devices illustrated in FIG. 2 may be combined, divided, re-arranged, omitted, eliminated and/or implemented in any other way. Further, the example the example display 102, the example sensor(s) 114, the example display interface 202, the example sensor interface 204, the example communication interface 206, the example gaze estimator 208, the example comparator 210, the example calibrator 212, the example database 214, the example trend analyzer 216, the example learning module 218, the example processor 116 and/or, more generally, the example eye tracking system 112 of FIG. 1 may be implemented by hardware, software, firmware and/or any combination of hardware, software and/or firmware. Thus, for example, any of the example the example display 102, the example sensor(s) 114, the example display interface 202, the example sensor interface 204, the example communication interface 206, the example gaze estimator 208, the example comparator 210, the example calibrator 212, the example database 214, the example trend analyzer 216, the example learning module 218, the example processor 116 and/or, more generally, the example eye tracking system 112 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example display 102, the example sensor(s) 114, the example display interface 202, the example sensor interface 204, the example communication interface 206, the example gaze estimator 208, the example comparator 210, the example calibrator 212, the example database 214, the example trend analyzer 216, the example learning module 218, the example processor 116 and/or, more generally, the example eye tracking system 112 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example eye tracking system 112 may include one or more elements, processes and/or devices in addition to, or instead of, those illustrated in FIG. 2, and/or may include more than one of any or all of the illustrated elements, processes and devices.

Turning in detail to FIG. 2, the display 102 and the sensor(s) 114 are communicatively and/or operatively coupled to the eye tracking system 112 via one or more communication links 220 such as, for example, signal wires and/or busses. Generally, the communication link(s) 220 can send and/or transmit (e.g., repeatedly or continuously) information or data between components (e.g., the display interface 202, the sensor interface 204, the communication interface 206, the gaze estimator 208, the comparator 210, the calibrator 212, the database 214, the trend analyzer 216 and/or the learning module 218) within the eye tracking system 112, the sensor(s) 114, the display 102 and/or the processor 116. For example, the sensor interface 204 receives the gaze data generated and/or gathered by the sensor(s) 114 while the user 110 views the display 102. In other examples, the display interface 202 sends and/or transmits information to the display 102 to control and/or alter one or more portion(s) or pixel(s) positioned on the screen 108 to provoke a reaction or response from the user 110, which is disclosed in greater detail below in connection with FIGS. 3A, 3B and 3C.

In some examples, the example eye tracking system 112 implements the example communication interface 206 to enable the eye tracking system to access one or more wired, wireless and/or web-based communication networks. For example, the communication interface 206 can access the Internet to communicate with a cloud-based computing platform and/or a server, in some examples, to send and/or receive data or information such as gaze data, calibration settings, etc.

In the illustrated example of FIG. 2, the eye tracking system 112 implements the gaze estimator 208 to determine a plurality of uncalibrated gaze locations while the user 110 views the display 102 based on the gaze data generated via the sensor(s) 114 and/or stored in the database 214. In some examples, as the user 110 focuses his or her gaze or attention to one or more of a plurality of image(s) 104 presented via the display 102, the gaze estimator 208 determines uncalibrated spatial coordinates associated with the viewed images 104 and relative to the screen 108 and/or the display 102. Additionally or alternatively, the gaze estimator 208 determines a timestamp and/or a relative time associated with the determined spatial coordinates. For example, based on the gaze data, the eye tracking system 112 determines a first uncalibrated gaze location including first uncalibrated spatial coordinates $(x_1, y_1)$ having values and an associated first timestamp $t_1$. In such examples, these spatial coordinates correspond to a certain position or location on the screen 108 and/or the display 102 and a relative time at which the gaze location was determined. These uncalibrated gaze locations can be modified and/or changed (e.g., via the calibrator 212) to provide calibrated gaze locations, which is disclosed in greater detail below.

In the illustrated example of FIG. 2, the example eye tracking system 112 implements the comparator 210 to process and/or analyze different gaze locations (e.g., calibrated) determined by the gaze estimator 208 and/or the calibrator 212. In some examples, the comparator 210 receives the gaze locations from the gaze estimator 208, the calibrator 212 and/or the database 214 via the communication link(s) 220.

After receiving the gaze locations, the comparator 210 performs comparisons between different consecutive pairs of gaze locations and different threshold values. These comparisons can indicate, in some examples, whether the calibration settings used by the eye tracking system 112 are accurate. For example, the comparator 210 compares a first gaze location to a second gaze location (i.e., a first pair of gaze locations) to determine one or more difference values (e.g., a value of an x-coordinate, a y-coordinate, a timestamp, etc.) between their respective spatial coordinates. For example, the comparator 210 determines a relative difference between an x-component and a y-component of the first gaze location and the second gaze location. The comparator 210 then compares the one or more difference values to a respective threshold value (e.g., a calculated and/or a predetermined threshold value). When met, these one or more threshold values can indicate whether calibration settings of the eye tracking system 112 are at least partially accurate and/or whether to update the calibration settings.

In some examples, when each of the threshold values is met, the calibration settings used by the eye tracking system 112 (e.g., via the calibrator 212) may be accurate. In other examples, when at least one of the threshold values is not met, the calibration settings are not accurate and may provide undesired inaccuracy when used to determine gaze locations.

In some examples, if the user 110 is determined to be disinterested, the calibrator 212 does not update the calibration settings, which can avoid incorrect calibration settings. In such examples, the comparator 210 compares different timestamps stored in the database 214 to provide a difference value of time associated with a reaction or response of the user 110. For example, after the display interface 202 alters a portion of the screen 108 and/or the display 102, a first timestamp is stored in the database 214. As the user 110 changes his or her attention or gaze to the altered portion of the display, the gaze estimator 208 determines a second gaze location and provides an associated second timestamp. In this example, the comparator 210 compares the first timestamp to the second timestamp to provide the difference value of time. In some such examples, a relatively large value of the time (e.g., 500 milliseconds, 750 milliseconds, 1 second, etc.) may indicate a disinterest of the user 110.

In the illustrated example of FIG. 2, as disclosed above, the eye tracking system 112 implements the calibrator 212 to modify, change and/or at least partially determine gaze locations with the gaze estimator 208 by using calibration settings. For example, first calibration settings can include a first calibration vector (e.g., a 2D vector) having respective magnitudes, directions and/or, more generally, vector components (e.g., an x-component $\hat{x}$ and/or a y-component $\hat{y}$). In this example, after the gaze estimator 208 determines a first gaze location (e.g., that is uncalibrated), the calibrator 212 advantageously utilizes the first calibration settings (e.g., the first calibration vector) to modify or change the first gaze location, which is disclosed in greater detail below. In some examples, the gaze estimator 208 and/or the calibrator 212 simultaneously determine the first gaze location and/or other (e.g., second, third, fourth, etc.) gaze locations.

In some examples, the first calibration vector and/or, more generally, the first calibration settings are determined and/or obtained by the eye tracking system 112 prior to using and/or viewing the display 102. For example, the user 110 performs a known calibration process and/or technique, such as by reading a set of successive instructions presented via the display 102, to enable the eye tracking system to provide the first calibration settings. In such examples, the user 110 is aware of the calibration process. In other examples, the user 110 can perform one or more discrete calibration processes while he or she views the display 102 to reduce disturbances and time spent following instructions, which is disclosed in greater detail below in connection with FIG. 4. In some such examples, the user 110 may be unaware that he or she is participating in the one or more calibration processes, which may be desired by the user 110. Generally, the calibrator 212 can update the first (or other) calibration settings and/or vector based on one or more comparisons performed by the comparator 210. For example, if at least one of the above-disclosed thresholds are not met by a comparison, the calibrator 212 updates, at least partially, the first calibration settings (e.g., the first calibration vector).

In the illustrated example of FIG. 2, the eye tracking system 112 implements the database 214 to store different data or information associated with the eye tracking system 112. For example, after the sensor(s) 114 generate and/or gather the gaze data, the sensor interface 204 transmits (e.g., via the communication link(s) 220) and stores the gaze data within the database 214. In some examples, after the gaze estimator 208 and/or the calibrator 212 calculate and/or determine gaze locations, the database 214 receives the gaze locations and/or associated spatial coordinates and timestamps as information or data via the communication link(s) 220. In other examples, after the display interface 202 alters the portion of the screen 108 and/or the display 102, an associated timestamp is stored in the database 214. In other examples, after the comparator 210 performs the one or more above-described comparisons, the database 214 receives associated results as data or information via the communication link(s) 220.

In the illustrated example of FIG. 2, the eye tracking system 112 implements the example trend analyzer 216 to process and/or analyze results of different comparisons performed by the comparator 210. As the comparator 210 continues iterations of comparisons, the above-disclosed difference values can approach a value (e.g., the first threshold value and/or the second threshold value) to provide a first trend. In some such examples, the trend analyzer 216 determines this first trend. In other examples, if the difference values fluctuate as the comparator 210 continues iterations, the first trend is not provided and, thus, the trend analyzer 216 does not determine the first trend.

In other examples, the trend analyzer 216 processes and/or analyzes other data or information stored in the database 214 to assess user activity, such as the user's reaction time to alterations of the display 102 and/or other characteristics associated with how the user 110 interacts with the display 102 and/or images 104 presented via the display 102. For example, as the comparator 210 continues iterations of comparisons, the trend analyzer 216 can identify a reaction time of the user 110 as increasing, as disclosed above, which may indicate disinterest of the user 110. In some examples, the trend analyzer 216 identifies other user activity that indicates the disinterest of the user 110. For example, during use of the eye tracking system 112 and/or the display 102, inputs and/or interactions provided by the user 110 (e.g., inputs via a mouse, a keyboard, a touch screen, etc.) may become less frequent and/or may cease over a time interval. In such examples, this user activity also indicates the disinterest of the user 110 and is identified by the trend analyzer 216.

In the illustrated example of FIG. 2, the eye tracking system 112 implements the example learning module 218 to advantageously utilize one or more known machine learning methods and/or techniques (e.g., supervised learning, unsupervised learning, etc.) to further modify or change gaze locations determined by the gaze estimator 208 and/or the calibrator 212. For example, the learning module 218 can use results from different comparisons performed by the comparator 210 as training data to provide predictive models, functions and/or algorithms associated with the user 110 based on the training data. In some such examples, the learning module 218 can use these predictive models, functions and/or algorithms to further modify or change one or more gaze locations determined by the gaze estimator 208 and/or the calibrator 212.

Figure 3A:
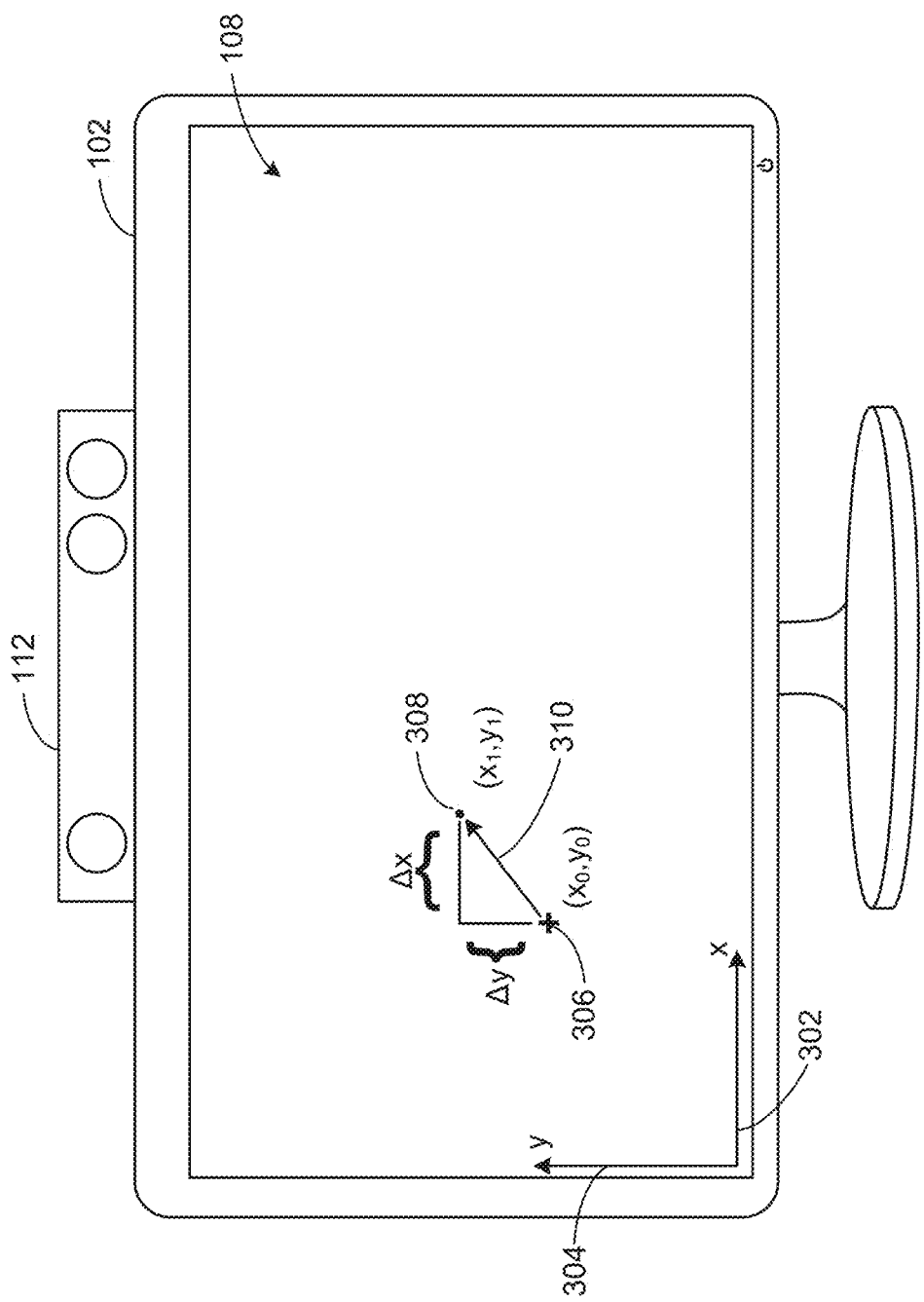
FIGS. 3A, 3B and 3C illustrate example screens of the example display of FIG. 1 in accordance with the teachings of this disclosure.
Figure 3B:
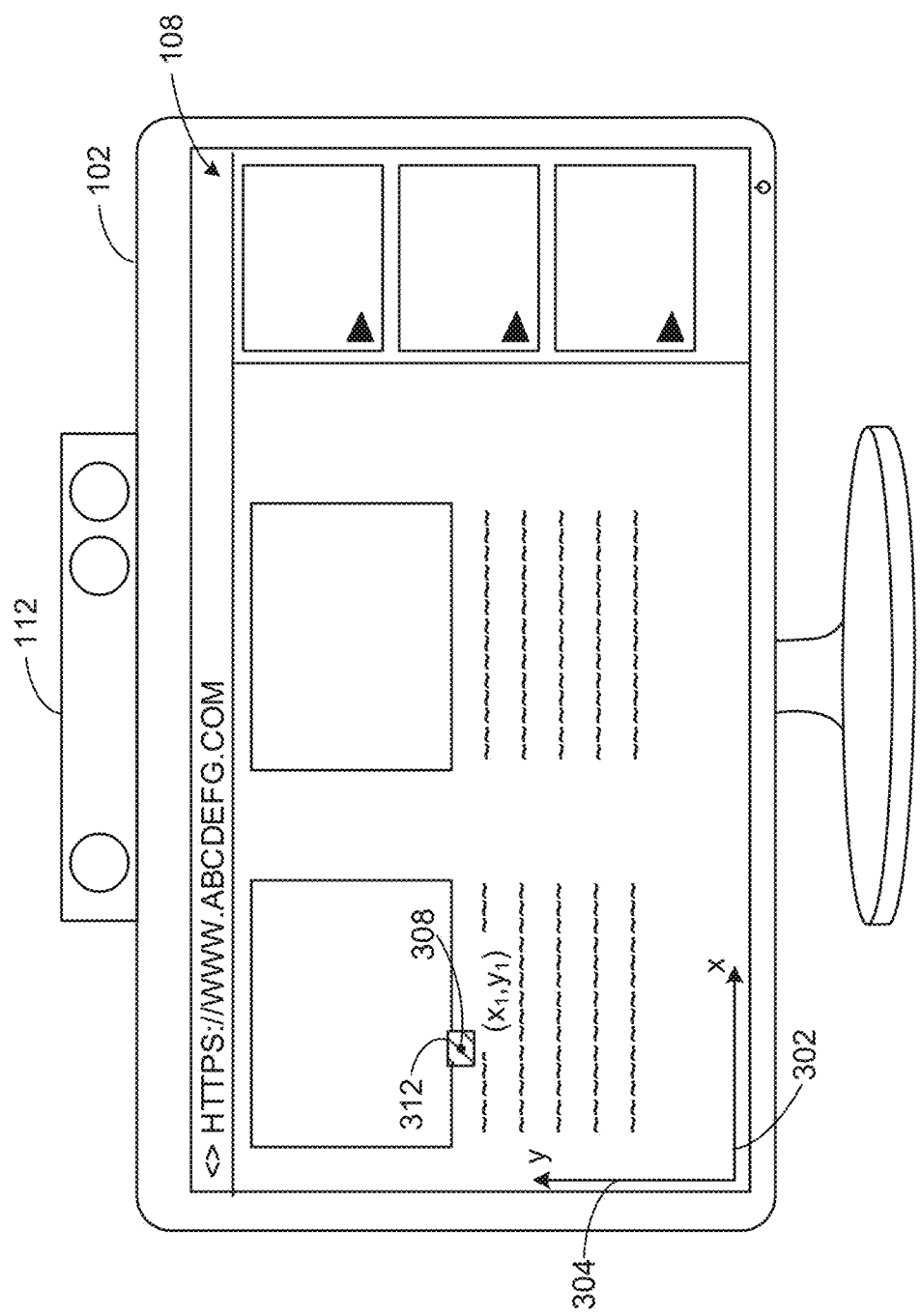
Figure 3C:
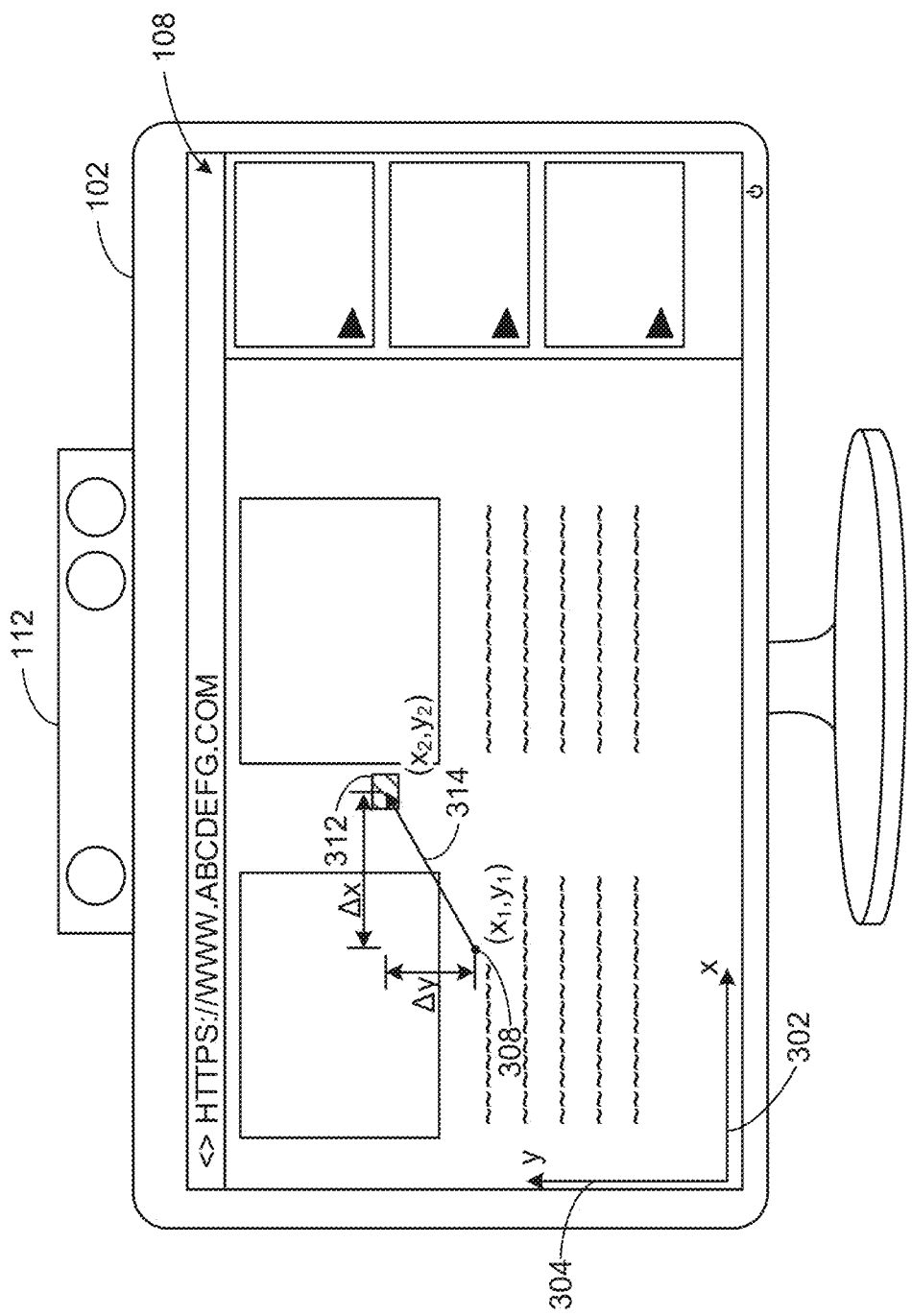

FIGS. 3A, 3B and 3C illustrate example screens of the example display 102 of FIG. 1 in accordance with the teachings of this disclosure. FIGS. 3A, 3B and 3C show the screen 108 and/or the display 102 having spatial coordinates (as represented by an x-axis 302 and a y-axis 304 in FIGS. 3A, 3B and 3C) relative to the screen 108 and/or the display 102 while the eye tracking system 112 monitors the user 110 (not shown). In the illustrated example of FIG. 3A, the eye tracking system 112 determined (e.g., via the gaze estimator 208) an uncalibrated gaze location 306 at first spatial coordinates (as represented by a cross symbol and a first set of values $(x_0, y_0)$ in FIG. 3A) relative to the screen 108 and/or the display 102. In this example, the eye tracking system 112 updated (e.g., via the calibrator 212) the uncalibrated gaze location 306 by using first calibration settings to provide a first gaze location 308 at second spatial coordinates (as represented by a dot symbol and a second set of values $(x_1, y_1)$ in FIG. 3A). In some examples, as mentioned above, the eye tracking system 112 simultaneously determines the uncalibrated gaze location and updates the location to provide the first gaze location 308.

In this example, the difference between the first spatial coordinates and the second spatial coordinates provides a first calibration vector (e.g., $\vec{v}$) 310 provided and/or defined by vector components such as, for example, an x-component $\hat{x}$ and a y-component $\hat{y}$ component each having values. In this example, the first calibration vector 310 has a value of an x-component (as represented by $\Delta x$ in FIG. 3A) and a value of a y-component (as represented by $\Delta y$ in FIG. 3A) provided by the difference between the first spatial coordinates and the second coordinates (e.g., where $\Delta x = x_1 - x_0$ and $\Delta y = y_1 - y_0$). In some such examples, the first calibration settings include this first calibration vector 310. In other examples, the eye tracking system 112 can update (e.g., via the calibrator 212) this first calibration vector 310 repeatedly, which is disclosed in greater detail below in connection with FIG. 4.

In some examples, as illustrated in FIG. 3B, the eye tracking system 112 alters a portion 312 (e.g., as represented by the square symbol in FIG. 3B) of the screen 108 and/or the display 102 associated with one or more determined gaze locations, which may provoke a reaction or response from the user 110 to change his or her attention or gaze to the altered portion 312. For example, after the eye tracking system 112 determines the first gaze location 308, the eye tracking system 112 alters the portion 312 of the screen 108 and/or the display 102 at the first spatial coordinates associated with the first gaze location 308 to cause the user 110 to change his or her attention or gaze to the portion 312.

In some examples, the eye tracking system 112 alters the portion 312 by changing a color of one or more pixels of the display 102 to contrast adjacent pixels, which may attract attention of the user 110 and facilitate the user's instinct and/or reaction to change his or her attention or gaze to the altered portion 312. In other examples, the eye tracking system 112 alters the portion 312 by providing a first shape that contrasts a second shape surrounding or adjacent to the first shape. In the illustrated example of FIG. 3B, the altered portion 312 includes the first shape that is square. In other examples, the altered portion 312 can include any other suitable shapes (e.g., circles, triangles, other regular or irregular polygons, etc.) and/or symbols that contrast shapes adjacent or nearby the one or more gaze locations. In some examples, the eye tracking system 112 alters the portion 312 for a time interval that may be associated with reaction characteristics (e.g., a reaction time) of the user 110, which may facilitate a natural response of the user 110 to change his or her attention or gaze to the altered portion 312 in response. For example, the eye tracking system 112 alters the portion 312 between about 1 millisecond and about 100 milliseconds. In other examples, the eye tracking system 112 can advantageously alter the portion 312 for any other suitable time interval (e.g., less than 1 millisecond and/or greater than 100 milliseconds) that provides a reaction or response from the user 110.

Additionally or alternatively, in some examples, the eye tracking system 112 continues iterations of altering the portion 312 of the display 102 to provoke continued reactions or responses from the user 110, thereby enabling the eye tracking system 112 to continue determining and comparing the above-disclosed consecutive pairs of gaze locations with the first threshold value and/or the second threshold value.

In some examples, when the portion 312 is altered at the first gaze location 308, the user 110 may not change his or her attention or gaze (e.g., toward the altered portion 312), which may indicate the calibration settings are accurate or the user 110 is not interested in and/or responsive to the altered portion 312. Otherwise, in other examples, when the user 110 changes his or her attention or gaze (e.g., toward the altered portion 312) in response to the portion 312 being altered at the first gaze location, the calibration settings are considered to be inaccurate.

In some examples, as illustrated in FIG. 3C, the eye tracking system 112 alters the portion 312 of the screen 108 and/or the display 102 offset to the gaze locations by a pre-determined distance 314 relative to those gaze locations. In this example, the eye tracking system 112 alters the portion 312 offset to the first gaze location 308 by the pre-determined distance 314 (as represented by $\Delta x$ and $\Delta y$ in FIG. 3C) at third spatial coordinates (as represented by a third set of values ($x_2$, $y_2$) in FIG. 3C). By altering the portion 312 offset to the first gaze location instead of at the first gaze location, the user 110 is encouraged and/or more likely to change his or her attention or gaze to the altered portion 312. In such examples, if the user's 110 attention or gaze changes exactly to the altered portion 312, the calibration settings are considered to be accurate. Otherwise, in other examples, if the user's 110 attention or gaze does not change or changes adjacent and/or near the altered portion 312, the calibration settings are considered to be inaccurate and/or the user 110 is considered to be disinterested. Additionally or alternatively, the portion 312 may provoke a different and/or unique reaction or response from the user 110 when altered offset to the first gaze location 308 by the pre-determined distance 314, instead of being altered at the first gaze location 308.

In such examples, by comparing (e.g., via the comparator 210) this pre-determined distance 314 with the first gaze location 308 and a subsequent second gaze location, the eye tracking system 112 determines whether some or all of the calibration settings are accurate (e.g., the x-component $\hat{x}$ and/or the y-component $\hat{y}$ of the first calibration vector 310). For example, at least one of the above disclosed threshold values includes, at least partially, this pre-determined distance 314 (e.g., $\Delta x$ and/or $\Delta y$ in FIG. 3).

Figure 4:
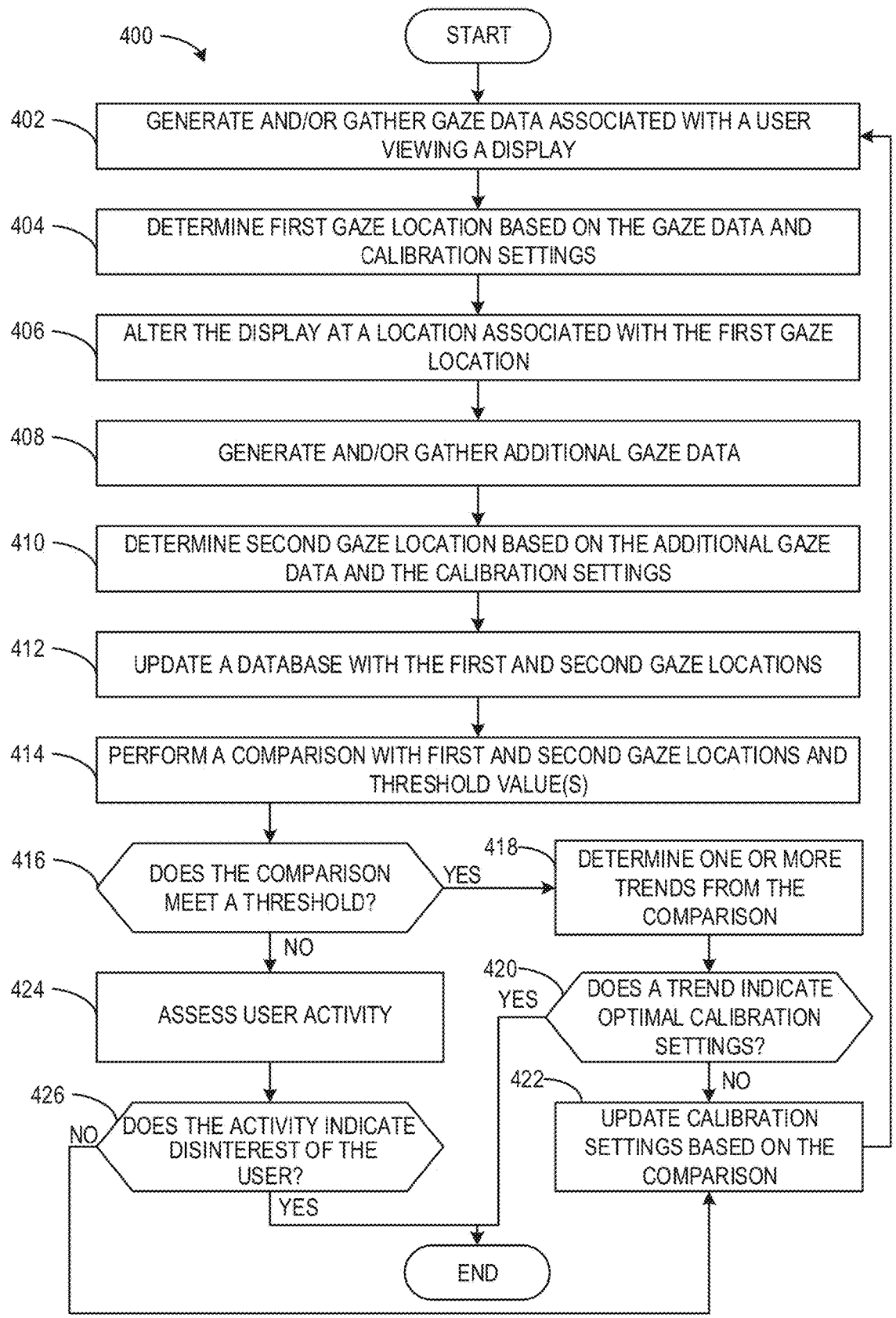
FIG. 4 is a flowchart representative of an example process that may be executed by the example system of FIG. 1 to implement the examples disclosed herein.

FIG. 4 illustrates a flowchart representative of an example process 400 that can be implemented to automatically determine gaze locations and/or update calibration settings associated with determining gaze locations. In some examples, as will be discussed in greater detail below, the example process 400 can iterate to continuously determine the gaze locations and/or update the calibration settings. The example process 400 can be implemented by using the example display 102 and/or, more generally, the example eye tracking system 112 of FIGS. 1 and 2.

The example process 400 begins by generating and/or gathering gaze data associated with the user 110 viewing the display 102 (block 402). As mentioned above, the display 102 can be a light-emitting diode display, a liquid crystal display, a projection display, etc. As the user 110 views the images 104 presented via the display 102, the eye tracking system 112 monitors the user 110. In some examples, the sensor(s) 114 of the eye tracking system 112 generate and/or gather gaze data based on where the user 110 is looking relative to the screen 108 and/or the display 102, for example, by detecting light emitting or reflecting from the user 110 (e.g., via his or her eye). As the sensor(s) 114 generate and/or gather the gaze data, the eye tracking system stores (e.g., via the database 214) the gaze data.

The example process 400 includes determining a first gaze location based on the gaze data and calibration settings associated with determining gaze locations (block 404). In some examples, first and/or current calibration settings are provided via one or more known calibration processes performed by the user 110. For example, when setting up or configuring the display 102 and/or the eye tracking system 112, the user 110 may read a set of instructions and/or may perform any other known suitable methods or techniques to acquire or obtain the first and/or current calibration settings.

In other examples, these first and/or current calibration settings are received from a cloud-based platform or server (e.g., via the Internet). For example, the communication interface 206 accesses one or more wired, wireless, and/or web-based communication networks to obtain the first and/or current calibration settings (e.g., from a server, a database, etc.).

In some examples, the first and/or current calibration settings are resident within the display 102 and/or the processor 116 (e.g., installed on the processor 116) and/or, more generally, resident within and/or programmed to the eye tracking system 112. In other examples, the first and/or current calibration settings include arbitrary or random vectors.

As disclosed above, the eye tracking system 112 determines (e.g., via the gaze estimator 208 and/or the calibrator 212) different gaze locations having respective spatial coordinates relative to the screen 108 and/or the display 102. For example, based on the generated and/or gathered gaze data (block 402) and the first and/or current calibration settings, the eye tracking system 112 determines a first gaze location (e.g., the first gaze location 308 of FIGS. 3A, 3B and 3C). In this example, the first gaze location is provided and/or defined by first spatial coordinates ($x_1$, $y_1$) having values, for example, where $x_1=100$, $y_1=200$ (these and other values in this disclosure are for illustrative purposes and other values may apply in other examples).

In this example, the eye tracking system 112 uses the first and/or current calibration settings, at least partially, to provide the first gaze location. As mentioned above, in the absence of any calibration settings, the eye tracking system 112 may provide undesired inaccuracies when determining the gaze locations. In some examples, the first and/or current calibration settings can include a calibration vector (e.g., the first calibration vector 310 of FIG. 3A) having vector components. The calibration vector can include an x-component $\hat{x}$ and a y-component $\hat{y}$ having values, for example, where $\hat{x}=10$ and $\hat{y}=10$ (other values may apply in other examples). In other examples, the first and/or current calibration settings can include any other suitable vector, formula, and/or equation. According to the illustrated example, when the eye tracking system 112 determines (e.g., via the gaze estimator 208) an uncalibrated gaze location provided and/or defined by uncalibrated spatial coordinates ($x_0$, $y_0$) having values, for example, where $x_0=90$ and $y_0=190$, the eye tracking system 112 updates (e.g., via the calibrator 212) the uncalibrated gaze location using the calibration vector to provide the first gaze location and first spatial coordinates ($x_1$, $y_1$), for example, where $x_1=x_0+\hat{x}=100$ and $y_1=y_0+\hat{y}=200$.

The example process 400 includes altering a portion of the display 102 at a location associated with the first gaze location (block 406), which may provoke a response from the user 110 to cause his or her attention or gaze to change to the altered portion, for example, if the user 110 is focusing his or her attention or gaze to a location on the display 102 that is different relative to the first gaze location. For example, the eye tracking system 112 sends and/or transmits information or data (e.g., via the display interface 202) to the display 102 to control and/or alter one or more portions (e.g., the portion 312 of FIGS. 3B and 3C) positioned on the screen 108 and/or the display 102. In some examples, the eye tracking system 112 controls one or more pixels positioned on the screen 108 and/or the display 102. Generally, after the eye tracking system 112 system determines the first gaze location (block 404), the eye tracking system 112 alters the portion of the screen 108 and/or the display 102 at or near the first spatial coordinates associated with the first gaze location (block 406) to potentially cause the user 110 to change his or her attention or gaze to the altered portion. If the user 110 changes his or her attention or gaze in response to the altered portion, the eye tracking system 112 analyzes this change in the user's attention or gaze to make one or more determinations, for example, whether the first and/or current calibration settings are accurate and/or whether the user 110 is disinterested, which is disclosed in greater detail below.

In some examples, when the portion 312 is altered at the first gaze location 308, the user 110 may not change his or her attention or gaze (e.g., toward the altered portion 312), which may indicate the calibration settings are accurate or the user 110 is not interested in and/or responsive to the altered portion 312. Otherwise, in other examples, when the user 110 changes his or her attention or gaze (e.g., toward the altered portion 312) in response to the portion 312 being altered at the first gaze location, the calibration settings are considered to be inaccurate.

In some other examples, after the eye tracking system 112 determines the first gaze location, the eye tracking system 112 alters the portion of the screen 108 and/or the display 102 offset to the first gaze location (e.g., the first spatial coordinates) by a pre-determined distance (e.g., the pre-determined distance 314 of FIG. 3C), which may provoke a different and/or unique reaction or response from the user 110 compared to altering the portion at the first gaze location. For example, when the first spatial coordinates include the first set of values $(x_1, y_1)$, where $x_1=100$, $y_1=200$, the eye tracking system 112 alters the portion of the screen 108 and/or the display 102 offset to the first spatial coordinates by the pre-determined distance provided by offset spatial coordinates $(x_A, y_A)$, for example, having values where $x_A=20$ and $y_A=20$. In this example, the eye tracking system 112 alters the portion of the screen 108 and/or the display 102 at resultant spatial coordinates $(x_R, y_R)$ relative to the first spatial coordinates $(x_1, y_1)$, for example, having values where $x_R=x_1+x_A=120$ and $y_R=y_1+y_A=220$. In other examples, the portion is altered by any other suitable pre-determined distance and/or spatial coordinates relative to the first gaze location. In such examples, by altering the portion 312 offset to the first gaze location instead of at the first gaze location, the user 110 is encouraged and/or more likely to change his or her attention or gaze to the altered portion 312. In some such examples, if the user's 110 attention or gaze changes exactly to the altered portion 312, the calibration settings are considered to be accurate. Otherwise, in other examples, if the user's 110 attention or gaze does not change or changes adjacent and/or near the altered portion 312, the calibration settings are considered to be inaccurate and/or the user 110 is considered to be disinterested Additionally or alternatively, in some examples, the eye tracking system 112 alters the portion by changing a color of one or more of the pixels of the display 102 to contrast adjacent pixels, which may attract the user's 110 attention or gaze and facilitate or induce the user's 110 response or reaction to change his or her attention or gaze to the portion. For example, when an image 104 at, near and/or offset to (e.g., by the pre-determined distance) the first gaze location includes a first color (e.g., black, blue, etc.) (i.e., a dark color), the eye tracking system 112 changes the color of the one or more surrounding or adjacent pixels to include a second color (e.g., white, yellow, etc.) (i.e., a light color) that contrasts the first color.

In other examples, the eye tracking system 112 alters the portion by providing a first shape that contrasts a second shape surrounding or adjacent to the first shape. For example, when the image 104 at or near the first gaze location includes a first shape (e.g., a circle, an oval and/or a general curvature, etc.), the eye tracking system 112 controls the one or more pixels to include a second shape (e.g., a square and/or a rectangle, etc.) that contrasts the first shape. In other examples, the altered portion can include any other suitable shapes (e.g., circles, triangles, other regular or irregular polygons, etc.) and/or symbols that contrast adjacent shapes and/or symbols, thereby facilitating or otherwise inducing the user's 110 reaction or response.

Additionally or alternatively, in some examples, the eye tracking system 112 alters the portion for a time interval that may be associated with reaction characteristics (e.g., a reaction time) of the user 110, which may further attract the user's 110 attention and/or facilitate and/or induce a natural response of the user 110 to change his or her attention or gaze to the portion. For example, the eye tracking system 112 can alter the portion between about 1 millisecond and about 100 milliseconds. In other examples, the eye tracking system 112 alters the portion for any other suitable duration of time that enables the user 110 to react to the altered portion while reducing disturbances and/or irritations that may have otherwise been perceived by the user 110 from using a relatively longer duration of time (e.g., 1 second, 2 seconds, etc.).

In some example, after the eye tracking system 112 alters the portion of the screen 108 and/or the display 102, the eye tracking system 112 generates and/or stores (e.g., via the database 214) a timestamp associated with when the portion was altered. For example, the eye tracking system 112 generates and/or stores a first timestamp $t_1$ having a value where $t_1=0$. The eye tracking system 112 compares this first timestamp $t_1$ to a second timestamp $t_2$, in some examples, to determine a disinterest of the user 110, which is disclosed in greater detail below.

The example process 400 includes generating and/or gathering additional gaze data (block 408). After the eye tracking system 112 determines the first gaze location (block 404), the user 110 may continue viewing the images 104 presented via the display 102 and, in such examples, the sensor(s) 114 continue to generate and/or gather gaze data based on where the user 110 is looking relative to the screen 108 and/or the display 102. For example, when the user 110 changes his or her attention or gaze to the altered potion of the display 102, as disclosed above, the sensor(s) 114 detect(s) this change and/or the light emitting or reflecting from the user 110 (e.g., via his or her eye). As the sensor(s) 114 continues to generate and/or gather the additional gaze data, the eye tracking system 112 stores (e.g., via the database 214) the additional gaze data.

The example process 400 includes determining a second gaze location based on the additional gaze data and the calibration settings (block 410). For example, based on the additional generated and/or gathered gaze data (at block 408) and the first and/or current calibration settings, the eye tracking system 112 determines a second gaze location. In some examples, the second gaze location is different from the first gaze location. For example, the second gaze location is provided and/or defined by second spatial coordinates ($x_2$, $y_2$) and the above-mentioned second timestamp $t_2$ having values, for example, where $x_2=110$, $y_2=225$ and $t_2=0.3$. In this example, the second timestamp $t_2$ is associated with when the second gaze location was determined (e.g., relative to when the portion of the screen 108 and/or the display 102 was altered). According to the illustrated example, the eye tracking system 112 advantageously uses the first gaze location and the second gaze location to determine whether the first and/or current calibration settings are accurate, which is disclosed in greater detail below.

The example process 400 includes updating the database 214 with the first and/or the second gaze locations (block 412). After the eye tracking system 112 determines the first gaze location (block 404), the second gaze location (block 410) and/or other (e.g., third, fourth, etc.) gaze locations, the eye tacking system 112 stores (e.g., via the database 214) the first gaze location, the second gaze location, and/or the other gaze locations as associated data or information. For example, the eye tracking system 112 stores respective spatial coordinates and timestamps having values associated with the first gaze location, the second gaze location and/or other gaze locations. In other examples, the eye tracking system 112 stores timestamps having values associated with when the portion of the screen 108 and/or the display 102 were altered.

The example process 400 includes performing a comparison of the first gaze location and the second gaze location with one or more threshold values (block 414), which indicates whether the first and/or current calibration settings are at least partially accurate. For example, the eye tracking system 112 compares (e.g., via the comparator 210) the first gaze location to the second gaze location (e.g., stored in the database 214). In some examples, as disclosed above, the comparison provides one or more difference values between the compared gaze locations. For example, when the first spatial coordinates ($x_1$, $y_1$) have values where $x_1=100$ and $y_1=200$ and the second spatial coordinates ($x_2$, $y_2$) have values where $x_2=110$, $y_2=225$, the eye tracking system 112 can provide first difference values such as a value of an x-component $x_{Dx}$ and a value of a y-component $y_{Dy}$, where $x_{Dx}=x_2-x_1=10$ and $y_{Dy}=y_2-y_1=25$.

The eye tracking system 112 compares (e.g., via the comparator 210) the difference value(s) to one or more respective thresholds, for example, to determine whether the first and/or current calibration settings are accurate and/or to update the first and/or current calibration settings. In some examples, the eye tracking system 112 compares the x-component $x_{Dx}$ of the difference value(s) to a first threshold value. For example, when the above-disclosed portion of the display 102 is altered at the first gaze location, the first threshold value is 0. In such examples, the first threshold value is met if the value of the x-component $x_{Dx}$ of the difference value(s) is equal to the first threshold value, where $x_{Dx}=0$, which indicates the first and/or current calibration settings are partially accurate.

Similarly, in some examples, the eye tracking system 112 compares the y-component $y_{Dy}$ of the difference value(s) to a second threshold value. For example, when the portion of the display 102 is altered at the first gaze location, the second threshold value is 0. In such examples, the second threshold value is met if the value of the y-component $y_{Dy}$ is equal to the second threshold value, where $y_{Dy}=0$, which indicates the first and/or current calibration settings are partially accurate.

According to the illustrated example, when the first threshold value and the second threshold value are met, the first and/or current calibration settings are considered accurate and may not require further or any updates.

Additionally or alternatively, in other examples, when the portion of the display 102 is altered offset to the first gaze location by the pre-determined distance disclosed above, the first threshold value is associated with the pre-determined distance. For example, the first threshold value can include the x-component $x_A$ of the above-disclosed offset spatial coordinates ($x_A$, $y_A$). In such examples, the first threshold value $x_A$ is met if an absolute value of the x-component $x_{Dx}$ of the difference value(s) is equal to an absolute value of the first threshold value $x_A$, where $|x_{Dx}|=|x_A|$.

Similarly, in other examples, when the portion of the display 102 is altered offset to the first gaze location by the pre-determined distance, the second threshold value is associated with the pre-determined distance. For example, the second threshold value can include the y-component $y_A$ of the offset spatial coordinates ($x_A$, $y_A$). In such examples, the first threshold value $y_A$ is met if an absolute value of the y-component $y_{Dy}$ of the difference value(s) is equal to an absolute value of the second threshold value $y_A$, where $|y_{Dy}|=|\Delta y|$.

Additionally or alternatively, in some examples, the eye tracking system 112 continues iterations of comparisons between consecutive pairs of determined gaze locations with the first threshold value and/or the second threshold value to eventually meet the first threshold value and/or the second threshold value. For example, the eye tracking system 112 compares: a third gaze location and a fourth gaze location with the first threshold value and the second threshold value respectively; a fifth gaze location and a sixth gaze location with the first threshold value and the second threshold value respectively; etc.

After performing the comparison (block 414), the example process 400 includes determining whether the threshold value(s) is/are met (block 416). In some examples, if the comparison meets the first threshold and the second threshold, the example process 400 includes identifying one or more trends of the comparison (block 418). Otherwise, in other examples, if the comparison does not meet the first threshold value and/or the second threshold value, the example process 400 proceeds to assess user activity (block 424), for example, to determine whether the user 110 is disinterested.

The example process 400 includes identifying one or more trends from the comparison (block 418). For example, the eye tracking system processes and/or analyzes (e.g., via the trend analyzer 216) results of different iterated comparisons (e.g., performed by the comparator 210). In such examples, as the eye tracking system 112 continues iterations of comparisons (block 414), successive results of the comparisons may consistently meet the first threshold and the second threshold to provide a first trend, which may indicate accurate calibration settings. For example, after each iterated comparison (block 414), the first trend includes consecutive values of the x-component of the difference value(s) (e.g., $x_{Dx}=x_2-x_1$, $x_{Dx}=x_4-x_3$, etc.) and consecutive values of the y-component of the difference value(s) (e.g., $y_{Dy}=y_2-y_1$, $y_{Dy}=y_4-y_3$, etc.) that meet the first threshold value (e.g., 0 and/or $\Delta x$) and the second threshold value (e.g., 0 and/or $\Delta y$) respectively. In some such examples, the eye tracking system 112 identifies (e.g., via the trend analyzer 216) this first trend. In other examples, if results of the comparisons do not consistently meet the threshold first threshold value and the second threshold value, the first trend is not provided and, thus, the eye tracking system 112 does not identify the first trend. In some examples, if the eye tracking system 112 has not performed more than one comparison (block 414), the eye tracking system 112 does not identify the first trend.

In some examples, by performing and/or iterating multiple comparisons as disclosed above, irrelevant determined gaze locations (i.e., outlier gaze locations) may be identified such as, for example, a gaze location that is significantly different from the other gaze locations, thereby causing the iterated comparisons to not consistently meet the first threshold value and/or the second threshold value. These outlier gaze locations can be caused by, for example, distractions perceived by the user 110 (e.g., pop-up ads or other spontaneous images presented via the display 102), noise within the sensor(s) 114, distractions in the external environment, etc. In such examples, outlier gaze locations, if any, may not negatively affect the above-disclosed first trend. For example, when performing multiple comparisons, a number of these outlier gaze locations may account for a relatively small percentage (e.g., less than 10%) of all the determined gaze locations. In some examples, when identifying the first trend, the eye tracking system 112 advantageously utilizes, for example, a confidence interval (e.g., a calculated and/or predetermined confidence interval) to filter and/or account for the outlier gaze locations, thereby determining whether these outlier gaze locations account for a significant portion of all the determined gaze locations. In some examples, if the determined gaze locations provided from the iterated comparisons include a majority of outlier gaze locations (e.g., greater than 50%), the eye tracking system 112 does not identify the first trend. In other examples, the eye tracking system 112 implements any other suitable equations, algorithms, methods and/or techniques (e.g., relating to statistics) to determine whether the outlier gaze locations negatively affect the first trend and, thus, enable the eye tracking system 112 to identify the first trend in the presence of outlier gaze locations.

The example process 400 includes determining whether a trend indicates accurate calibration settings (block 420). In some examples, if the eye tracking system 112 identifies the first trend disclosed above, which indicates accurate calibration settings, the example process 400 ends. In other examples, if the eye tracking system 112 does not identify the first trend, the examples process 400 includes updating the first and/or current calibration settings based on the comparison (block 422), which may increase accuracy when determining subsequent gaze locations.

The example process 400 includes updating the calibration settings (e.g., the first and/or current calibration settings) based on the comparison (block 422). For example, if the first threshold value is not met by the comparison (block 414), the eye tracking system 112 updates (e.g., via the calibrator 212) the x-component $\hat{x}$ of the calibration vector. In some examples, updating the x-component $\hat{x}$ of the calibration vector includes decreasing and/or increasing a value of the x-component $\hat{x}$ by using value associated with the x-component $x_{Dx}$ of the difference value(s). In some such examples, when the first threshold value is 0 and the x-component $x_{Dx}$ of the difference values(s) is greater than the first threshold value at the comparison (block 414), the eye tracking system 112 reduces the value of the x-component $\hat{x}$ of the calibration vector by the x-component $x_{Dx}$ of the difference value(s). That is, when the first threshold value is 0 and $x_{Dx}>0$, the eye tracking system 112 reduces the x-component $\hat{x}$ of the calibration vector by the x-component $x_{Dx}$ of the difference value(s), where $\hat{x}=\hat{x}-x_{Dx}$. Similarly, when the first threshold value is 0 and $x_{Dx}<0$, the eye tracking system 112 increases the value of the x-component $\hat{x}$ of the calibration vector by the x-component $x_{Dx}$ of the difference value(s), where $\hat{x}=\hat{x}+x_{Dx}$.

In some examples, when the first threshold value includes the x-component $x_A$ of the offset spatial coordinates $(x_A, y_A)$ and $x_{Dx}>x_A$, the eye tracking system 112 reduces the x-component $\hat{x}$ of the calibration vector by a value provided by $x_{Dx}-x_A$, where $\hat{x}=\hat{x}-(x_{Dx}-x_A)$. Similarly, in other examples, when the first threshold value includes the x-component $x_A$ of the offset spatial coordinates $(x_A, y_A)$ and $x_{Dx}<x_A$, the eye tracking system 112 increases the x-component $\hat{x}$ of the calibration vector by the value provided by $x_A-x_{Dx}$, where $\hat{x}=\hat{x}+(x_{Dx}-x_A)$.

Additionally or alternatively, in some examples, if the second threshold value is not met by the comparison (block 414), the eye tracking system 112 updates (e.g., via the calibrator 212) the y-component $\hat{y}$ of the calibration vector. In some examples, updating the y-component $\hat{y}$ of the calibration vector includes decreasing and/or increasing a value of the y-component $\hat{y}$ by using a value associated with the y-component $y_{Dy}$ of the difference value(s). In some such examples, when the second threshold value is 0 and the y-component $y_{Dy}$ of the difference value(s) is greater than the second threshold value at the comparison (block 414), the eye tracking system 112 reduces the value of the y-component $\hat{y}$ of the calibration vector by the y-component $y_{Dy}$ of the difference value(s). That is, when the second threshold value is 0 and $y_{Dy}>0$, the eye tracking system 112 reduces the y-component $\hat{y}$ of the calibration vector by the y-component $y_{Dy}$ of the difference value(s), where $\hat{y}=\hat{y}-y_{Dy}$. Similarly, when the second threshold value is 0 and $y_{Dy}<0$, the eye tracking system 112 increases the value of the y-component $\hat{y}$ of the calibration vector by the y-component $y_{Dy}$ of the difference values, where $\hat{y}=\hat{y}+y_{Dy}$.

In some examples, when the second threshold value includes the y-component $y_A$ of the offset spatial coordinates $(x_A, y_A)$ and $y_{Dy}>y_A$, the eye tracking system 112 reduces the y-component $\hat{y}$ of the calibration vector by a value provided by $y_{Dy}-y_A$, where $\hat{y}=\hat{y}-(y_{Dy}-y_A)$. Similarly, in other examples, when the second threshold value includes the y-component $y_A$ of the offset spatial coordinates $(x_A, y_A)$ and $y_{Dy}<y_A$, the eye tracking system 112 increases the y-component $\hat{y}$ of the calibration vector by the value provided by $y_A-y_{Dy}$, where $\hat{y}=\hat{y}+(y_{Dy}-y_A)$.

In some examples, after at least partially updating the first and/or current calibration settings (block 422), the example process 400 iterates by continuing and/or returning to generating and/or gathering gaze data associated with the user 110 viewing the display 102 (block 402). In some such examples, the eye tracking system 112 determines subsequent gaze locations using the updated calibration settings (e.g., the updated calibration vector). For example, the eye tracking system 112 determines a third gaze location based on the generated and/or gathered gaze data and the updated calibration settings (block 404). In some such examples, the eye tracking system 112 continues iterations of display alterations (block 406) and gaze location comparisons (block 414) and/or, more generally, the example process 400 iterates until the first threshold value and the second threshold value are met and the above-disclosed first trend is determined (e.g., via the trend analyzer 216).

Additionally or alternatively, in some examples, the example process 400 includes assessing user activity (block 424). In some examples, as the example process 400 iterates, a reaction time of the user 110 can increase, which may indicate a disinterest of the user 110, as mentioned above. That is, a time interval between when the portion of the display 102 was altered (e.g., $t_1$) by the eye tracking system 112 (block 406) and when the user 110 changed his or her attention or gaze (block 410) to the corresponding determined gaze location (e.g., the above-disclosed second gaze location) (e.g., $t_1$) can be relatively large (e.g., $t_2-t_1>1$ second) and/or can gradually increase as the example process 400 iterates. In such examples, the eye tracking system 112 identifies (e.g., via the trend analyzer 216) this user activity.

In some examples, the eye tracking system 112 identifies other user activity that indicates disinterest of the user 110. For example, during use of the eye tracking system 112 and/or the display 102, inputs and/or interactions provided by the user 110 (e.g., inputs via a mouse, a keyboard, a touch screen, etc.) may become less frequent and/or may cease. In such examples, this user activity also indicates the disinterest of the user 110 and is identified by the eye tracking system 112 (e.g., via the trend analyzer 216).

After assessing user activity, the example process 400 includes determining whether there is a disinterest of the user 110 (block 426). In some examples, if the eye tracking system 112 identifies the disinterest, the example process 400 ends. Otherwise, the example process 400 proceeds to update the first and/or current calibration settings (block 422).

The flowchart of FIG. 4 is representative of an example process 400 and/or machine-readable instructions for implementing the example eye tracking system 112 of FIGS. 1 and 2. In this example, the machine-readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example eye tracking system 112 may alternatively be used. For example, the order of execution of the blocks may be changed, and/or some of the blocks described may be changed, eliminated, or combined.

As mentioned above, the example process of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media and carrier waves. As used herein, "tangible computer-readable storage medium" and "tangible machine-readable storage medium" are used interchangeably. Additionally or alternatively, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals or carrier waves and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 5:
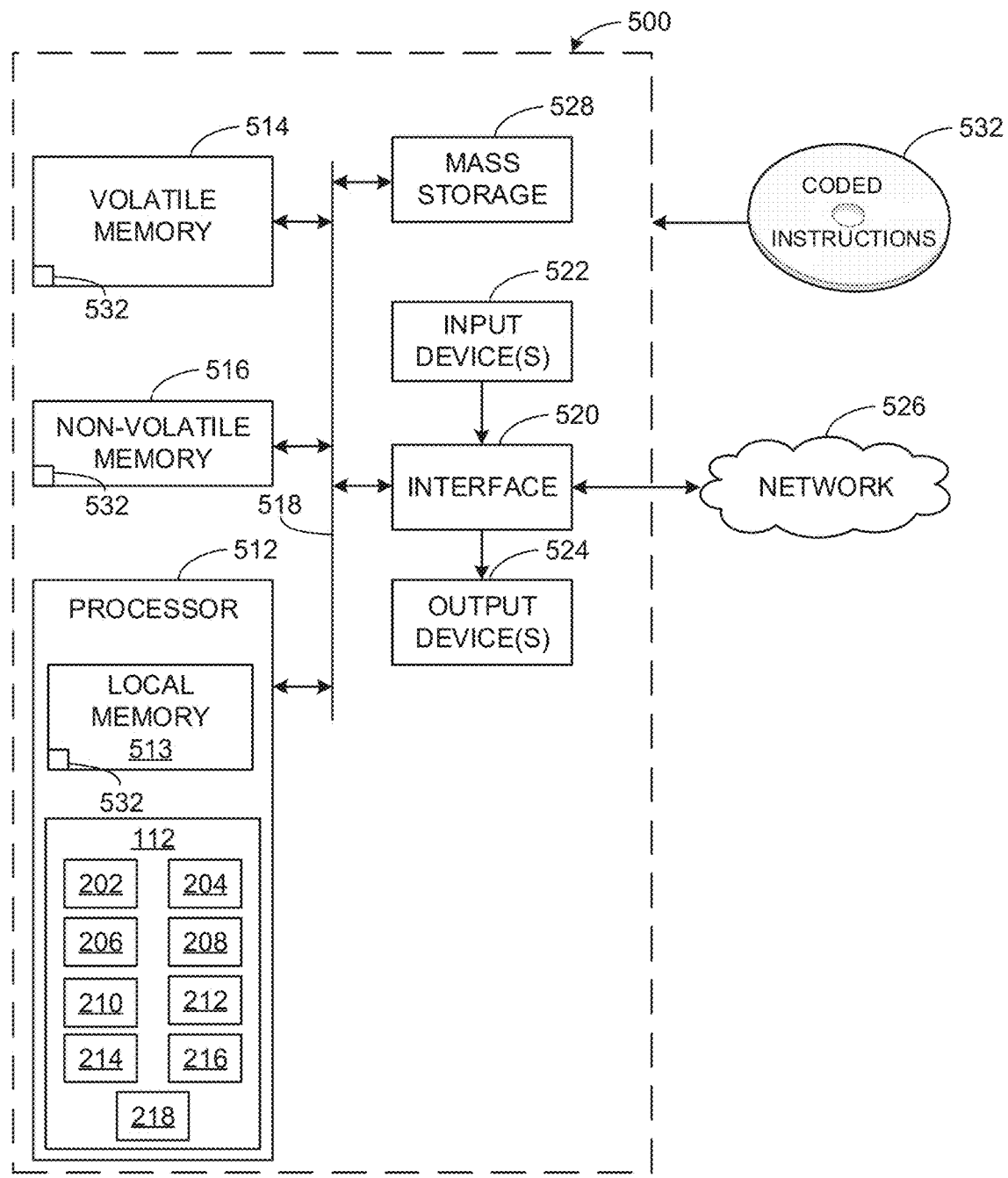
FIG. 5 is a block diagram of an example processing platform capable of executing example machine-readable instructions to implement the process of FIG. 4 and/or the example system of FIG. 1.

FIG. 5 is a block diagram of an example processor platform 500 capable of executing the instructions of FIG. 4 to implement the example eye tracking system 112 of FIG. 2. The processor platform 500 can be, for example, a server, a personal computer, a mobile device (e.g., a cell phone, a smart phone, a smart watch, a headset, a tablet such as an iPad™), a personal digital assistant (PDA), an Internet appliance, a DVD player, a CD player, a digital video recorder, a Blu-ray player, a gaming console, a personal video recorder, a set top box, or any other type of computing device or device having computing capabilities.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example executes the instructions to implement the example eye tracking system 112. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device (s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the volatile memory 514, in the non-volatile memory 516, and/or on a removable tangible computer readable storage medium such as a CD or DVD.

From the foregoing, it will be appreciated that the above disclosed systems and methods optimize eye tracking systems by increasing accuracy when determining gaze locations. Additionally or alternatively, examples disclosed herein perform calibration processes associated with the eye tracking systems while reducing and/or eliminating distractions, disturbances, and/or inconveniences perceived by one or more users.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
 a sensor to gather gaze data from a user viewing media on a display; and
 a processor communicatively coupled to the display and the sensor, the processor to:
  perform a calibration process including:
   a) determining a first estimated gaze location of the user based on a first calibration setting;
   b) altering a portion of the display;
   c) after the portion of the display has been altered, determining a second estimated gaze location of the user based on the first calibration setting;
   d) comparing a difference between the first estimated gaze location and the second estimated gaze location to a first distance threshold and to a second distance threshold;
   e) when the difference does not satisfy the first distance threshold, identify the second estimated gaze location as an outlier gaze location;
   f) when the difference does not satisfy the second distance threshold, mark the first calibration setting as inaccurate; and
   g) when the difference satisfies the second distance threshold, mark the first calibration setting as accurate;
  iteratively repeat the calibration process with replacement of the first calibration setting with a different calibration setting for respective iterations of the calibration process;
  determine whether a trend is present that indicates an accurate calibration setting based on results of the comparisons performed during two or more of the iterations of the calibration process; and
  update the first calibration setting when the trend is not present.

2. The system of claim 1, wherein the processor is to determine the trend is present when succeeding ones of the comparisons of the iterations of the calibration process converge toward or satisfy the second distance threshold.

3. The system of claim 1, wherein the processor is to:
 identify a number of gaze locations identified as outlier gaze locations during the iterations of the calibration process; and
 compare the number of outlier gaze locations to an outlier threshold.

4. The system of claim 3, wherein the processor is to determine the trend is not present when the number of outlier gaze locations does not satisfy the outlier threshold.

5. The system of claim 4, wherein the outlier threshold is a percentage of a total number of gaze locations determined during the iterations of the calibration process.

6. The system of claim 5, wherein the percentage is 50%.

7. The system of claim 1, wherein the portion of the display altered during the calibration process corresponds to the first estimated gaze location.

8. The system of claim 1, wherein the portion of the display altered during the calibration process is offset from the first estimated gaze location by a predetermined distance.

9. The system of claim 8, wherein the second distance threshold is associated with the predetermined distance.

10. The system of claim 1, wherein the processor is to alter the portion of the display during the calibration process for a time interval between about 1 millisecond and about 100 milliseconds.

11. The system of claim 1, further including the display, the display being part of at least one of a personal computer, a smart phone, a tablet, or a headset, and wherein the sensor is physically coupled to the display.

12. A tangible machine-readable storage medium comprising instructions that, when executed, cause at least one processor to at least:
 gather gaze data from a user viewing media presented on a display;
 perform a calibration process including:
  a) determining a first estimated gaze location of the user based on a first calibration setting;
  b) altering a portion of the display;
  c) after the portion of the display has been altered, determining a second estimated gaze location of the user based on the first calibration setting;

d) comparing a difference between the first estimated gaze location and the second estimated gaze location to a first distance threshold and to a second distance threshold;
e) when the difference does not satisfy the first distance threshold, identify the second estimated gaze location as an outlier gaze location;
f) when the difference does not satisfy the second distance threshold, mark the first calibration setting as inaccurate; and
g) when the difference satisfies the second distance threshold, mark the first calibration setting as accurate;
iteratively repeat the calibration process with replacement of the first calibration setting with a different calibration setting for respective iterations of the calibration process;
determine whether a trend is present that indicates an accurate calibration setting based on results of the comparisons performed during two or more of the iterations of the calibration process; and
update the first calibration setting when the trend is not present.

13. The tangible machine-readable storage medium of claim 12, wherein the instructions, when executed, cause the at least one processor to determine the trend is present when consecutive ones of the comparisons of the iterations of the calibration process converge toward or satisfy the second distance threshold.

14. The tangible machine-readable storage medium of claim 12, wherein the instructions, when executed, cause the at least one processor to:
identify a number of gaze locations identified as outlier gaze locations during the iterations of the calibration process; and
compare the number of outlier gaze locations to an outlier threshold.

15. The tangible machine-readable storage medium of claim 14, wherein the instructions, when executed, cause the at least one processor to determine the trend is not present when the number of outlier gaze locations does not satisfy the outlier threshold.

16. The tangible machine-readable storage medium of claim 15, wherein the outlier threshold is a percentage of a total number of gaze locations determined during the iterations of the calibration process.

17. The tangible machine-readable storage medium of claim 12, wherein the portion of the display altered during the calibration process corresponds to the first estimated gaze location.

18. The tangible machine-readable storage medium of claim 12, wherein the portion of the display altered during the calibration process is offset from the first estimated gaze location by a predetermined distance.

19. The tangible machine-readable storage medium of claim 18, wherein the second distance threshold is associated with the predetermined distance.

20. The tangible machine-readable storage medium of claim 12, wherein the instructions, when executed, cause the at least one processor to alter the portion of the display during the calibration process by including a first shape that contrasts a second shape surrounding or adjacent to the first shape.

21. An apparatus comprising:
memory;
instructions; and
at least one processor to execute the instructions to:
gather gaze data from a user viewing media presented on a display; and
perform a calibration process including:
a) determining a first estimated gaze location of the user based on a first calibration setting;
b) altering a portion of the display;
c) after the portion of the display has been altered, determining a second estimated gaze location of the user based on the first calibration setting;
d) comparing a difference between the first estimated gaze location and the second estimated gaze location to a first distance threshold and to a second distance threshold;
e) when the difference does not satisfy the first distance threshold, identify the second estimated gaze location as an outlier gaze location;
f) when the difference does not satisfy the second distance threshold, mark the first calibration setting as inaccurate; and
g) when the difference satisfies the second distance threshold, mark the first calibration setting as accurate;
iteratively repeat the calibration process with replacement of the first calibration setting with a different calibration setting for respective iterations of the calibration process;
determine whether a trend is present that indicates an accurate calibration setting based on results of the comparisons performed during two or more of the iterations of the calibration process; and
update the first calibration setting when the trend is not present.

22. The apparatus of claim 21, wherein the at least one processor is to determine the trend is present when consecutive ones of the comparisons of the iterations of the calibration process converge toward or satisfy the second distance threshold.

23. The apparatus of claim 21, wherein the at least one processor is to:
identify a number of gaze locations identified as outlier gaze locations during the iterations of the calibration process; and
compare the number of outlier gaze locations to an outlier threshold.

24. The apparatus of claim 23, wherein the at least one processor is to determine the trend is not present when the number of outlier gaze locations does not satisfy the outlier threshold.

25. The apparatus of claim 24, wherein the outlier threshold is a percentage of a total number of gaze locations determined during the iterations of the calibration process.

26. The apparatus of claim 21, wherein the portion of the display altered during the calibration process corresponds to the first estimated gaze location.

27. The apparatus of claim 21, wherein the portion of the display altered during the calibration process is offset from the first estimated gaze location by a predetermined distance.

28. The apparatus of claim 27, wherein the second distance threshold is associated with the predetermined distance.

29. The apparatus of claim 21, wherein the at least one processor is to alter the portion of the display during the calibration process by including a first shape that contrasts a second shape surrounding or adjacent to the first shape.

* * * * *